United States Patent [19]

Lafont et al.

[11] 4,116,678
[45] Sep. 26, 1978

[54] METHOD OF PRODUCING IRON

[75] Inventors: Robert Lafont, Gif sur Yvette; Louis H. Hallot, Gagny, both of France

[73] Assignee: Regie Nationale des Usines Renault, Boulogne-Billancourt, France

[21] Appl. No.: 760,819

[22] Filed: Jan. 19, 1977

[30] Foreign Application Priority Data

Jan. 20, 1976 [FR] France ............................ 76 01333

[51] Int. Cl.$^2$ .............................................. C21C 5/52
[52] U.S. Cl. .......................................... 75/11; 75/38; 75/40
[58] Field of Search ................ 75/38, 40, 11, 33–37

[56] References Cited

U.S. PATENT DOCUMENTS

| | | | |
|---|---|---|---|
| 2,287,663 | 6/1942 | Brassert | 75/11 |
| 2,545,932 | 3/1951 | Tiddy et al. | 75/35 |
| 3,147,107 | 9/1964 | Brooke | 75/38 |
| 3,985,544 | 10/1976 | Collin et al. | 75/11 |

FOREIGN PATENT DOCUMENTS

| | | | |
|---|---|---|---|
| 876,757 | 8/1942 | France | 75/11 |
| 1,168,942 | 9/1958 | France | 75/11 |

Primary Examiner—M. J. Andrews
Attorney, Agent, or Firm—Oblon, Fisher, Spivak, McClelland & Maier

[57] ABSTRACT

In a method of producing iron by direct reduction of the ore, compaction into agglomerates and fusion, where the ore is reduced by a gaseous process with pre-reduction to monoxide FeO at 1000° C, followed by a final reduction at 700°C. The resultant powder is compacted into agglomerates and dumped, in successive loads after each pour, into an induction melting furnace and melted by contact and mixing with a preexistent charge of liquid metal. An amount equivalent to the newly-melted charge is poured into a refining ladle, after skimming off the slag.

5 Claims, 1 Drawing Figure

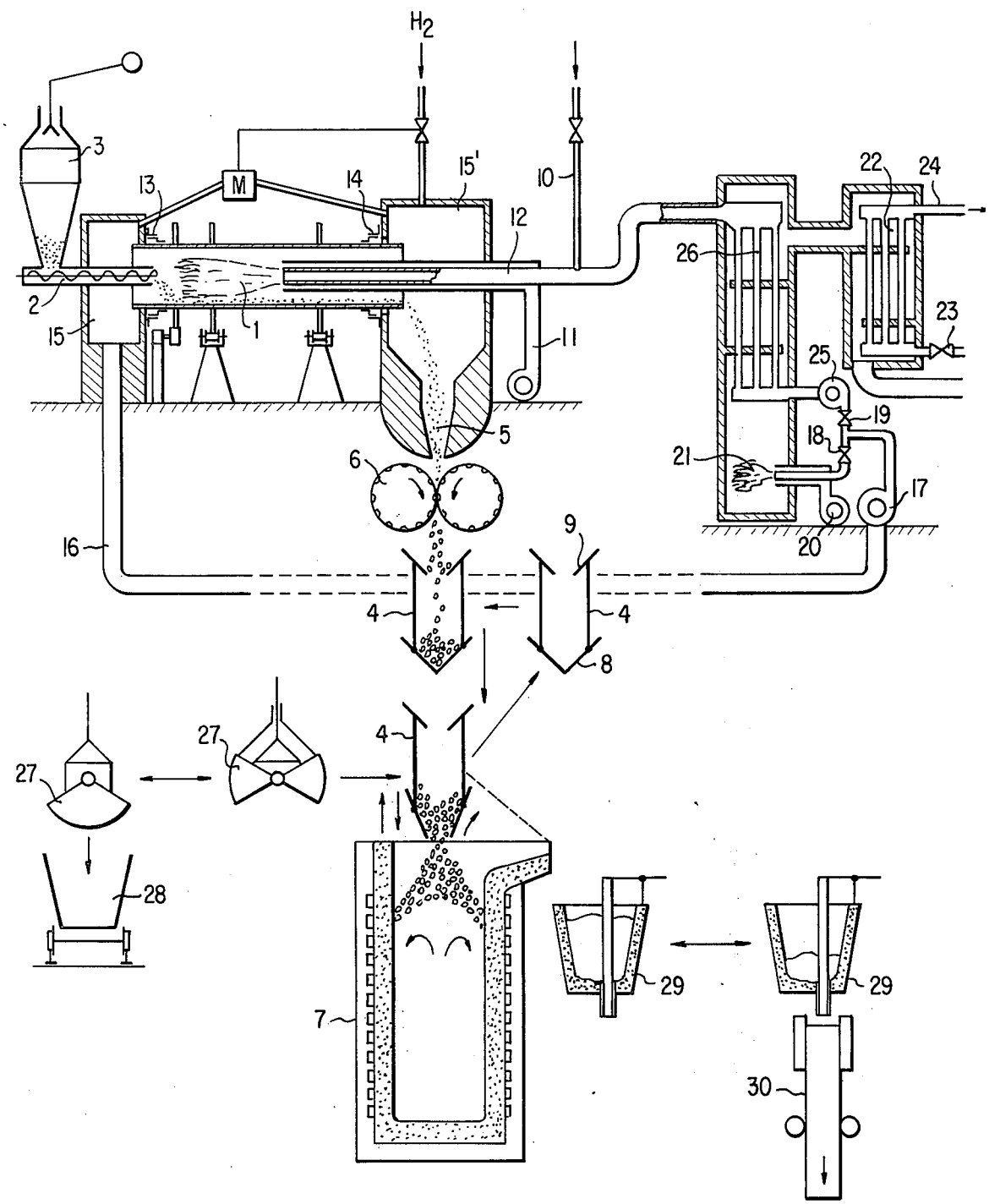

METHOD OF PRODUCING IRON

BACKGROUND OF THE INVENTION

1. Field of the Invention

The present invention relates generally to a method of producing metals, and more particularly to a method of producing ferrous metals, especially steels, starting with pre-reduced iron ores.

2. Description of the Prior Art

Various attempts have been made to replace conventional steel-producing methods by reduction of the ore in a blast furnace, the production of pig iron and transformation into steel in the Martin furnace or converter and final refining in the arc furnace. These conventional processes have proved costly in investment and in energy and it has been tried, with varying success, to concentrate into a single continuous sequence of operations the transition from ores to usable metals and alloys.

The initial enrichment of the ores and their reduction are now, by known techniques, posing no particular problems. The difficulties arise at the stage of melting and refining, given the dispersed state of the reduced ore and its large content of residual impurities and oxides which the pre-reduction cannot completely eliminate.

The fusion of these pre-reduced ores in the form of spongy agglomerates in cupola-type vertical furnaces, but heated at their base by gas flames, the molten metal being then treated in the converter, has led to difficulties in regulation and a yield too low to have an advantage over the conventional blast furnace.

It has been tried, with electric blast furnaces, operating without coke, to produce steel directly without the intermediary of pig iron. It does not appear that this technique has had any better success.

Direct fusion in the conventional arc furnace, on the other hand, has the following drawbacks, namely, consumption of expensive electrodes, consumption of oxygen for the refining process, long metallurgical operations lowering the furnace output considerably, electrical power demand varying very rapidly with time and over wide ranges, noise sometimes exceeding the threshold of pain, production of relatively large quantities of dust, discontinuous operation yielding large quantities of metal at rather long intervals, and continual variation in the composition of the bath hardly lending itself to a production by the continuous process.

These drawbacks, especially the operating efficiency, are further aggravated by the local and intense nature of the heating by the arc plasma and the dispersed nature of the pre-reduced ore. For these reasons, this production technique does not appear to deserve further consideration.

SUMMARY OF THE INVENTION

The aim of the present invention is a production method eliminating the drawbacks of operating difficulties and energy losses by combining a sequence of processes and an operating technique adapted to the raw materials in order to achieve, with the greatest smoothness, the best energy efficiency and the least investment, high-quality products, and of course to provide an apparatus for carrying out such method.

Starting with ore enriched by known techniques, one proceeds first with the operation of reducing the ore, preferably using the gaseous reduction techniques constituting the object of French Pat. Nos. 1,268,478 and 1,259,048 in the name of the applicant.

In a second phase, the ore reduced by a continuous method to powder form at a temperature of about 700° C. is then agglomerated to the form of briquettes, pellets or ropy bars by self-evident procedures, taking advantage of the output heat of the pre-reduction furnace of the preceding phase. This compacting operation is likewise performed in a continuous manner in a very short time, as for instance that disclosed in French Pat. No. 1,261,982 in the name of the applicant, the material thus formed being accumulated in the form of separate charges for successive feeding to the fusion furnace.

The fusion phase is then realized by means of a low-capacity induction furnace, a portion of its liquid-metal content being poured off to make room for a charge of agglomerates, still hot, produced by the compacting operation. This charge melts rapidly, without superheating, by contact with the metal of the bath being constantly mixed by induced currents. This mixing on the one hand and the divided nature of the agglomerates on the other leads to rapid fusion of the added charge, but without strong superheating. The vibrations inherent to this mode of fusion assist the descent of the agglomerates of the charge through the layer of slag to the surface of the bath. When melting is completed, the slag is removed, its viscosity favoring this skimming operation. A charge of molten metal corresponding to the previously added amount is then poured into a refining ladle.

After a standard refining operation in the ladle, the metal charge may then be utilized for a continuous casting process or any other application. The pouring of a succession of charges of appropriate volumes is particularly suited to continuous casting operations.

It is seen that the method of the invention uses only the heating energy strictly necessary for the operations of pre-reduction and fusion with the smoothness and increased efficiency afforded by induction fusion and its direct heating. Compared to arc furnaces used heretofore for this type of application, the induction crucible furnace offers such advantages as no consumption of the electrodes, no consumpiton of oxygen in making the steel, uniform demand on electrical power, great ease in charging, low production of dust, very slight variation in content of the elements of the bath and thus great stability of the chemical composition, energy consumption of the same order of magnitude as in the arc furnace, silent operation while the noise levels of arc furnaces are at the limits of tolerance and sometimes exceed it, almost continuous fusion if one works with alternate charges and pours of a fifth or an eighth of the crucible capacity, and thus great advantage for continuous casting, and very high productivity, the dead or down times being very short.

BRIEF DESCRIPTION OF THE DRAWINGS

Various other objects, features and attendant advantages of the present invention will be more fully appreciated as the same becomes better understood from the following detailed description when considered in connection with the accompanying drawing, wherein the sole FIGURE is a schematic illustration of an installation applying the method of the present invention.

DETAILED DESCRIPTION OF THE ILLUSTRATED EMBODIMENT

The first phase of the method of the present invention is a direct reduction of the ore, previously enriched and made into power. This reduction could be effected by the method of the aforementioned French Pat. No. 1,268,478, where it is performed in two stages by the gaseous method.

In a first stage, the ore in the form of $Fe_3O_4$ or $Fe_2O_3$ is reduced to FeO at 950°–1100° C. by a gas containing carbon monoxide, hydrogen and nitrogen after partial combustion of methane or other combustible hydrocarbon-base gases.

In a second stage, the monoxide of iron FeO is reduced to Fe by a gas rich in hydrogen at a temperature of 650° to 750° C. Alternatively, one could utilize the method of reduction in a rotating furnace described in the aforementioned French Pat. No. 1,259,048.

In a preferred variant of the method described below, with the help of the attached drawing, the two stages of reduction are combined in a single rotary kiln 1 having the two required temperature zones arranged in succession, thus realizing a simplification of the installation and a better yield, at the expense of regulating the gaseous atmospheres of each zone by balancing the pressures.

The powdered enriched ore is introduced into the kiln 1 from a storage hopper 3 by a conveyor screw 2. The kiln 1 is a rotating one of the cement-kiln type, set up as described in the aforementioned French Pat. No. 1,259,048. Two successive zones having temperatures of 1000° C. and 700° C. are formed by adjustment of the burner flames. The output of a hydrogen $H_2$ feed pipe, enriching the 700° C. temperature zone, is regulated on the basis of a differential manometer M sensing the pressure in each end-chamber of the kiln. The conventional type of regulation assures control of the atmospheres of the two zones of the kiln.

The kiln burner is disposed axially at the far end of the kiln 1 and comprises three coaxial pipes 10, 11 and 12. The pipes 10 and 11, respectively, bring in the combustible gas, e.g. natural gas, and air, the flow cross-sections thereof being proportioned to the required flows. Separators, necessarily disposed in spirals, maintain the spacing of the coaxial walls and assist the circulation of the gases and thermal exchange.

In this arrangement, the concentric tubes or pipes 10, 11 and 12 of the burner, interconnected by the separators, not shown, form a mechanically rigid unit and project rather far into the kiln 1 so as to position the flame sufficiently far from the output end. This flame heats the zone to 1000° C. The rear portion of the kiln, traversed by the burner but not directly heated thereby, will naturally form the 700° C. zone. The gases passing through the burner tubes will cool the tubes, while themselves being heated, thus increasing the energy efficiency. The outer pipe 11 would preferably carry the coolest gas, e.g. the air or the combustible gas, and the central pipe 12 would receive the recycled and reheated gas coming from the exchanger 26. The intermediate tube 10 would receive the combustible gas or air supply, which would thus be preheated by the central pipe.

This arrangement thus provides for preheating the kiln gases and cooling the burner pipes, while forming in the single rotating kiln the two successive zones of temperature and controlled atmospheres required by the method of the invention.

In the axial burner of the rotating kiln, the primary air is supplied in insufficient quantity for complete combustion so that the combustible gas may be the reducer for transforming the ore to monoxide. A general composition for the gas after combustion is:

$H_2$: 21.2%
CO: 7.5
$H_1O$: 7.2
$CO_2$: 7
$N_2$: 57.1

Actually there must be 4 to 20% CO and 8 to 30% $H_2$, with the remainder being $CO_2$, $H_2O$ and $N_2$.

The additional hydrogen injected as $H_2$ in the 700° C. zone increases the rate of reduction to monoxide FeO.

A slight overpressure in the zone at 1000° C. will tend to maintain it.

The gas escaping from the rotating kiln by way of an airtight chamber 15 at the forward end of the kiln and ducting 16 leading therefrom is drawn off by a blower 17 and divided into two essentially equal portions by valves 18, 19. The ore is supplemented with secondary air furnished by a blower 20 and burnt completely in a firebox, maintained at more than 1000°, of a heat recuperator 21. The flames of this firebox pass along the refractory stainless-steel tubes of the recuperator and the fumes are exhausted at a moderate temperature of the order of 460°. From here they go to a smoke-stack, either directly or, better, after passing through an economizer 22 for heating water which is brought in by a line 23 and is taken out hot by a line 24.

The other fraction of the gas, representing nearly 50% thereof, is forced by a blower 25 through the refractory tubes 26 of the exchanger, where it is reheated to a temperature of the order of 760°. The hot gas is then sent through the central pipe of the rotating kiln's burner so that the kiln is constantly held at 1000° on this side.

By way of example, the materials for the process are established as follows: per ton of rich hematite ore $Fe_2O_3$ an hour, the consumption of methane-rich natural gas is about 115 $M^3$. The amount of monoxide produced is 900 Kg per hour. The primary air for the rotating kiln's burner amounts to 575 $M^3$/hr and the secondary air for the recuperator burner to 225 $M^3$/hr.

The thermal efficiency is excellent since it corresponds to 218 Kg of metallurgic coke per ton of iron and, besides, natural gas is used to the exclusion of special and scarce fuels.

One could construct, on the same principle, units having a much higher production capacity, e.g., on the order of 200 to 800 tons in 24 hours.

The same method is applicable in case methane-rich natural gas is replaced by cracking gas or a hydrocarbon or a mixture of hydrocarbon gases or liquids.

The indicated temperatures are given by way of example to illustrate a concrete case, but the principle may be observed with somewhat different operating levels.

In a variant of the method, the recycled hot gas may be partially or completely mixed with the natural gas for the primary burner of the rotary kiln.

The kiln output, in the form of powder or friable particles, is composed of 80 to 98% iron, 1 to 18% monoxide FeO and 0.1 to 1.9% carbon, with 2 to 15% gangue containing, depending on the ore used, lime, silica, magnesia, alumina, etc.

The kiln output is received by an end-chamber 15' at the far end thereof which is closed off by an airtight seal 14. The output is received in a discharge hopper 5, located at the base of the chamber 15' at a temperature of about 600° to 700°.

The agglomeration process is then carried out, the powder falling from the outlet of hopper 5 onto contrarotating dimpled rollers 6 between which it is compacted to agglomerates of appropriate size by a self-evident technique. This compaction is helped out by the temperature of the powder. Another technique of compaction by rolling, according to French Pat. No. 1,261,932, in the name of the applicant, could likewise be used.

Upon leaving the compacting device 6, the agglomerates, of density 4 to 6.8, are collected in buckets 4 for transport to the fusion furnace 7. These bucket loads may be filled out by addition of slag. The buckets 4, in the form of vertical cylinders, have dumping means 8 at their lower ends and funnels 9 at their upper ends. These funnels, on the one hand, make it easier to collect the agglomerates leaving the compacting device 6 and, on the other hand, reduce the size of the inlet opening and thus the heat loss from the agglomerates accumulated in the buckets 4 before fusion, as well as their reoxidation.

Given the relatively short holding time of the charges accumulated in the buckets before fusion, on the order of 30 min to 1 hr 30 min. the temperature drop, and therefore the energy loss, is reduced to a minimum. In addition, the charges are thus protected from again taking up any moisture from the ambient air. The added slag is advantageously put into an empty bucket where it is preheated by contact with the agglomerates of the charge which then covers it. It later assures, from the onset of fusion, the viscosity required for the slag. This cold added slag likewise helps to cool the bottom 8 of the bucket 4 after charging the furnace 7. The bucket 4, with its filled-out charge, is then transported to a position above the furnace 7 after each pouring operation to renew the charge while another bucket is being filled in its turn. The charge is emptied into the furnace 7 by opening of the dumping bottom 8 of the bucket 4, as indicated in the FIGURE.

The fusion furnace 7, being an induction furnace, preferably a low-frequency one and of at least 50 ton capacity, the agitation of the bath will result in rapid fusion of the charge, itself having retained part of its heat of formation.

The rapid melting of the charge is due to the intense washing of the agglomerates by the liquid metal. Because it is denser than the slag, the agglomerates pass through it to the surface of the bath. Their arrival at the level of the bath and their dissolution by it is accelerated by the intense vibrations produced by the induction fusion. Thus, in contrast to conventional induction fusion, where a solid charge is melted as a whole and where the inductive mixing does not occur until the end of fusion when the entire charge is liquid, here melting is effected by surface contact with an existing liquid charge which is mixed spontaneously. This fusion by mixing and "washing" does not require a metal bath a high temperature and thus saves the crucible linings.

At the end of fusion, the gangue floating on relatively cool slag which is therefore rather viscous, is readily removed. One can use, for this purpose, buckets 27 with opening bottoms, the buckets being placed, at the completion of fusion, over the furnace 7 in place of the charging buckets 4. They are lowered with their bottoms open to the surface of the bath, the edges of the jaws of the bottom effectively embracing the entire surface of the bath. In closing, the jaws trap the slag inside the bucket 27 which then empties the same into a dump car 28.

With the bath being thus skimmed, one then proceeds with the pour into a ladle 29 after an adjustment in temperature.

For production of ordinary steels for which no metallurgic operation is performed, a continuous casting 30 is fed directly from the ladle 29.

For the production of finer steels of higher quality, or alloy steels, the metallurgy could be carried out in the ladle 29 and the metal then reheated and placed in a medium-frequency induction furnace of suitable capacity before utilization.

By way of example, one could use as the fusion furnace of the invention a low-frequency induction furnace of 100 t capacity fed by a 35 MVA transformer developing 33,000 KW in the winding at 50 Hz, capable of maximum output of 34.7 t per hour, working with alternate charges and pours of 20 t. To keep down the investment, the charging could be done with 5 t bottom-opening buckets, possibly automated. One could then introduce four successive 5 t charges and make one pour into a 20 t ladle. The 20 t of metal could be sent directly into the manifold of a continuous casting or subjected to metallurgic procedures before use. Such a furnace would have the following characteristics: inside diameter of crucible 2.200 m — height of bath 3.70 m — the compensation supply would be one of 270,000 KVAr at 3000 volts and the floating supply 19,250 KVar.

Immediately after each pour, a new bucket 4 brings in a new charge of 20.5 to 25 tons of hot pre-reduced agglomerates. The rhythm of fusion and charging can readily be adapted to the sequence of a continuous-casting process. The metal poured at regular intervals represents each time $\frac{1}{4}$ to $\frac{1}{8}$ of the total liquid metal in the furnace. A 50 t furnace, considered to be the minimum size, would thus produce a pour of 10 tons every 20 minutes. The remaining quantity, constantly agitated by inductive mixing, is used as the means for melting the new charge.

The refining of the steel, the addition of carbon and alloying ferro-elements for arriving at the desired composition, may be done in the ladle 29 by a conventional technique. This ladle may then serve to feed the continuous casting 30 or an ingot mold.

Thus, the method of the invention permits fabrication of steel by way of direct reduction with reduced means and energy consumption, bringing to these techniques, by the induction fusion, the precision and smoothness of operation which they lack.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of producing iron by direct reduction of ore, compaction into agglomerates and fusion of the reduced ore comprising the steps of:

reducing said ore by a gaseous process in two stages,
   first a prereduction to iron monoxide FeO in a 950°–1100° C. reducing atmosphere in a first reduction zone, then, without transition, reducing said iron monoxide at a temperature between 650°–750° C. in powdered form in a second reduction zone;

immediately compacting the resultant powder to agglomerates at the output temperature of a reducing kiln and collecting such agglomerates in a continuous manner which limits their cooling;

melting said agglomerates by mixing and contacting the same with a pre-existing charge of liquid metal in an induction furnace, to complete fusion; and skimming the slag of said fusion and then pouring a resulting liquid metal charge into a ladle, to be refined, treated and poured, and then fed into a continuous casting installation.

2. A method as set forth in claim 1, further comprising a step of rotating said kiln wherein said step of reducing said ore includes successively traversing enriched ore, in powdered form in the rotating kiln while constantly mixing the ore by rotation of the kiln through the first reduction zone of the kiln maintained by a reducing flame of burning hydrocarbon gases and through the second rotation zone in an end chamber portion disposed adjacent the kiln and enriching the atmosphere in said second reaction zone by the introduction of hydrogen.

3. A method as set forth in claim 2, further comprising balancing the pressures in said first and said second reduction zones by the introduction of hydrogen into said second reduction zone.

4. A method as set forth in claim 1, further comprising melting said agglomerates in said induction fusion furnace by operating said induction fusion furnace at low frequency, about 50 hertz, and of at least 50 ton capacity.

5. A method as set forth in claim 1, wherein the successively melted and poured charges are about a quarter to an eight of the charge of molten metal in the induction fusion furnace.

* * * * *